United States Patent
Yoshikawa

(10) Patent No.: US 9,467,543 B2
(45) Date of Patent: Oct. 11, 2016

(54) ELECTRONIC APPARATUS AND ELECTRONIC SYSTEM

(75) Inventor: Shinya Yoshikawa, Fukushima (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 477 days.

(21) Appl. No.: 13/572,936

(22) Filed: Aug. 13, 2012

(65) Prior Publication Data

US 2013/0093958 A1    Apr. 18, 2013

(30) Foreign Application Priority Data

Oct. 12, 2011   (JP) ................................. 2011-225076

(51) Int. Cl.

| | |
|---|---|
| *H04M 1/60* | (2006.01) |
| *G01C 21/36* | (2006.01) |
| *H04M 1/725* | (2006.01) |
| *H04N 21/41* | (2011.01) |
| *H04N 21/414* | (2011.01) |
| *H04N 21/45* | (2011.01) |
| *H04N 21/472* | (2011.01) |
| *H04N 21/81* | (2011.01) |

(52) U.S. Cl.
CPC ........ *H04M 1/6083* (2013.01); *G01C 21/3661* (2013.01); *H04M 1/7253* (2013.01); *H04N 21/4122* (2013.01); *H04N 21/41407* (2013.01); *H04N 21/41422* (2013.01); *H04N 21/4524* (2013.01); *H04N 21/47217* (2013.01); *H04N 21/8113* (2013.01); *H04M 1/72558* (2013.01)

(58) Field of Classification Search
USPC ....................................................... 348/837
See application file for complete search history.

(56) References Cited

U.S. PATENT DOCUMENTS

| | | | |
|---|---|---|---|
| 6,496,848 B1* | 12/2002 | Nankaku ....................... | 718/100 |
| 7,502,686 B1 | 3/2009 | Pemble et al. | |
| 2002/0101368 A1* | 8/2002 | Choi et al. ...................... | 341/61 |
| 2006/0258406 A1 | 11/2006 | Igarashi et al. | |
| 2008/0162666 A1* | 7/2008 | Ebihara et al. ............... | 709/217 |

(Continued)

FOREIGN PATENT DOCUMENTS

| | | |
|---|---|---|
| EP | 2299711 | 3/2011 |
| JP | 2003-319020 | 11/2003 |

(Continued)

OTHER PUBLICATIONS

Extended European Search Report for EP12187997 dated Feb. 11, 2013, 6 pgs.
Office Action dated Sep. 30, 2015 for JP2011-225076, 6 pgs including English translation.

*Primary Examiner* — Tracy Y Li
(74) *Attorney, Agent, or Firm* — Brinks Gilson & Lione

(57) ABSTRACT

An electronic apparatus is connected to an information terminal for receiving image data and audio data relating to an application executed in the portable information terminal and outputting the image data and audio data. The electronic apparatus includes an identification information detecting unit which detects identification information added to the audio data received from the information terminal, an interrupt determining unit which determines the presence of an interrupt event in the information terminal on the basis of the detected identification information, and an output control unit which transmits, when it is determined that an interrupt event has occurred, a control signal for transferring image data relating to an application in which the interrupt event has occurred to the information terminal.

20 Claims, 12 Drawing Sheets

(56) References Cited

U.S. PATENT DOCUMENTS

| | | |
|---|---|---|
| 2009/0121655 A1* | 5/2009 | Kojima et al. ............ 315/307 |
| 2009/0164607 A1* | 6/2009 | Clark et al. ............ 709/219 |
| 2010/0328493 A1* | 12/2010 | Hanlon et al. ............ 348/231.9 |
| 2011/0276334 A1* | 11/2011 | Wang ............ G06F 17/30861 704/270 |
| 2012/0064875 A1* | 3/2012 | Miller ............ H04M 1/72522 455/418 |
| 2013/0167027 A1* | 6/2013 | Adolph et al. ............ 715/716 |

FOREIGN PATENT DOCUMENTS

| | | |
|---|---|---|
| JP | 2004251757 | 9/2004 |
| JP | 2008078696 | 4/2008 |
| JP | 2008160248 | 7/2008 |
| JP | 2009-281991 | 12/2009 |

* cited by examiner

IMAGE: MUSIC PLAY SCREEN
AUDIO: MUSIC

NAVIGATION INTERRUPT OCCURS →

IMAGE: MUSIC PLAY SCREEN
AUDIO: INTERSECTION GUIDE

| IDENTIFICATION INFORMATION | AUDIO DATA | IMAGE DATA |
|---|---|---|
| 0001 | MENU | MENU |
| 0002 | NAVIGATION (NORMAL) | NAVIGATION (NORMAL) |
| 0003 | INTERSECTION GUIDE | INTERSECTION GUIDE |
| 0004 | INCOMING CALL | INCOMING CALL |
| 0005 | OUTGOING CALL | OUTGOING CALL |
| 0006 | PLAY MEDIA | PLAY MEDIA |
| . . . | . . . | . . . |

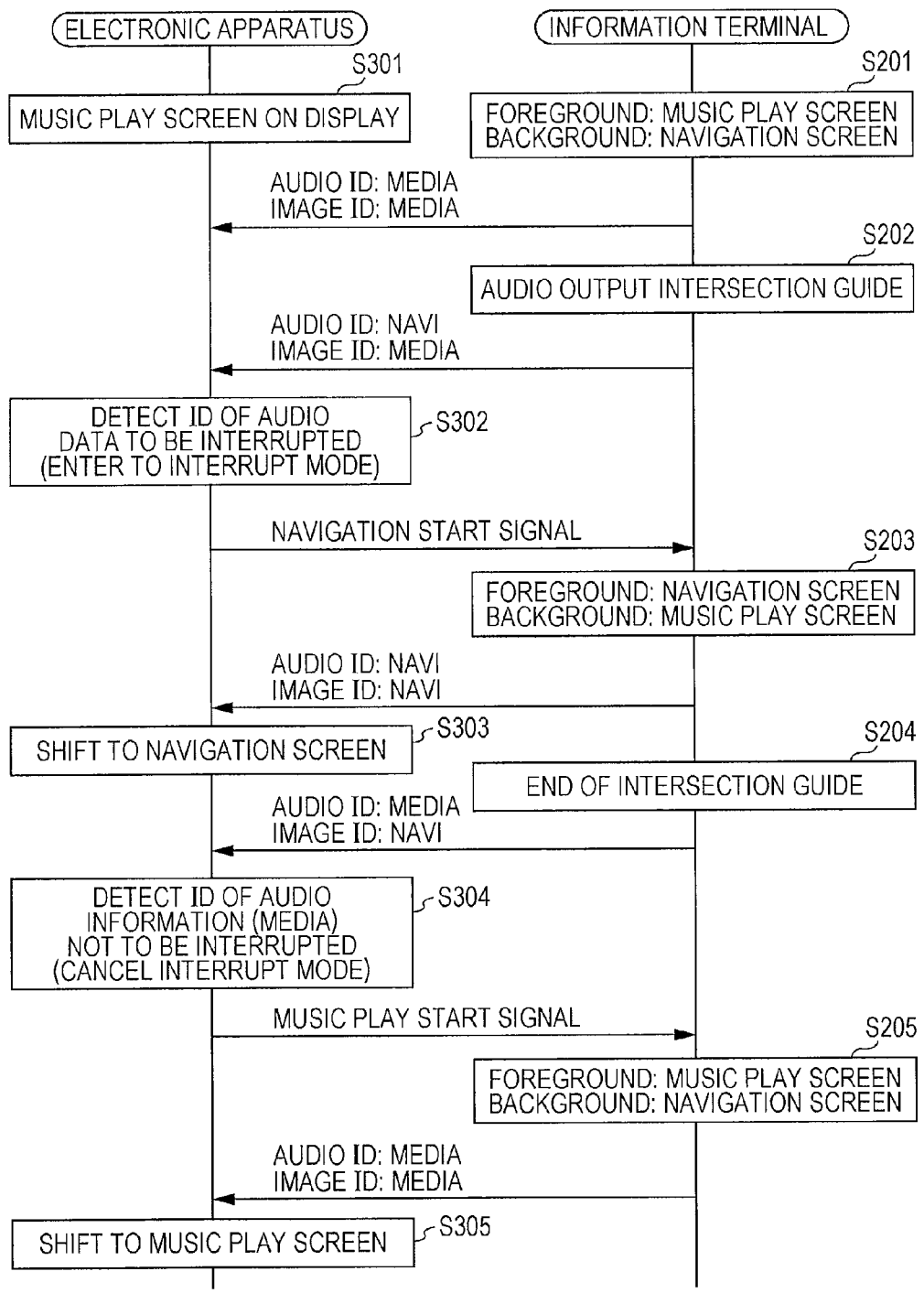

IMAGE: MUSIC PLAY SCREEN
AUDIO: TUNE

NAVIGATION INTERRUPT OCCURS

IMAGE: INTERSECTION GUIDE SCREEN
AUDIO: INTERSECTION GUIDE

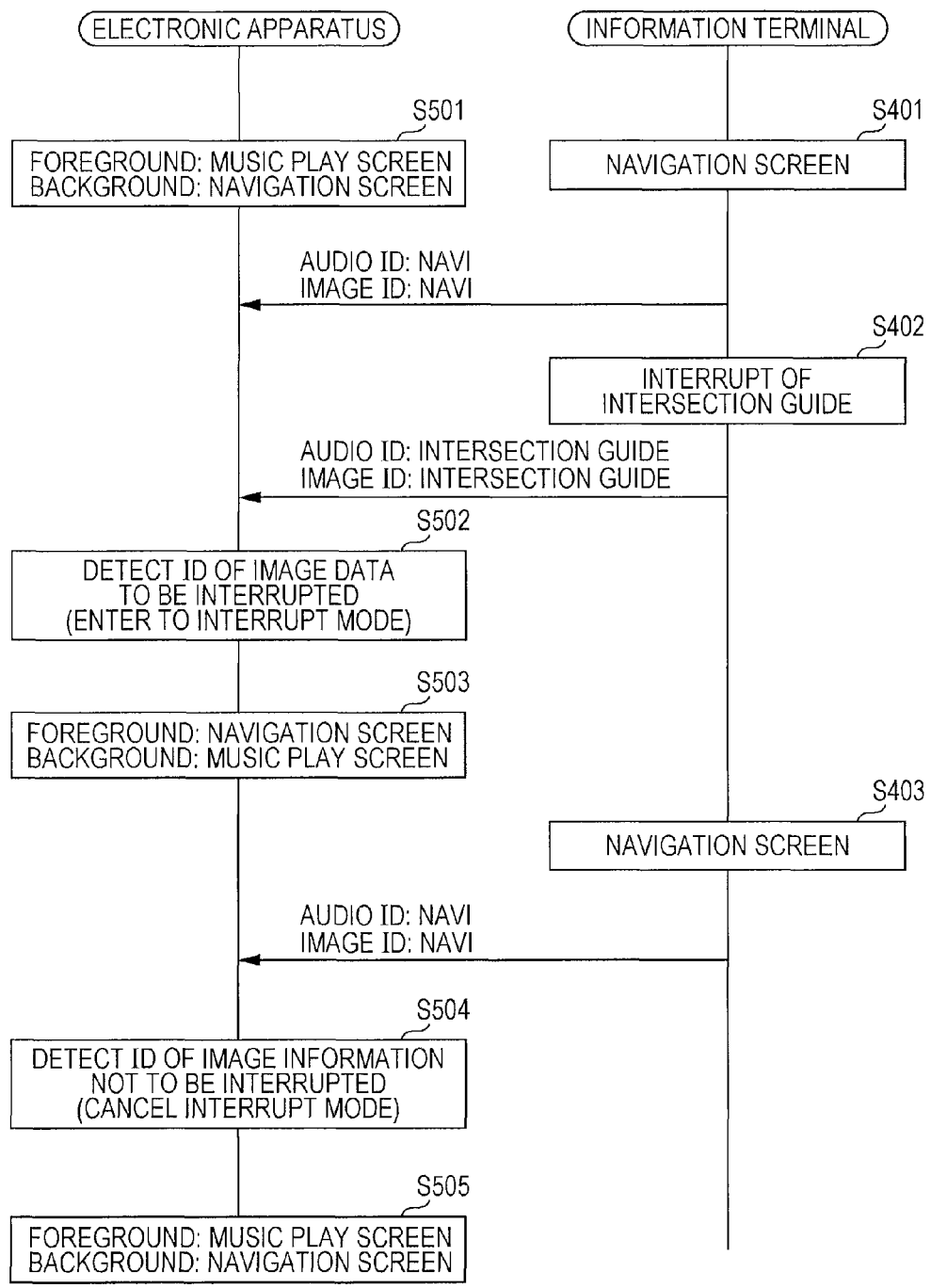

ELECTRONIC APPARATUS AND ELECTRONIC SYSTEM

RELATED APPLICATION

The present application claims priority to Japanese Patent Application Number 2011-225076, filed Oct. 12, 2011, the entirety of which is hereby incorporated by reference.

BACKGROUND OF THE INVENTION

1. Field of the Invention

The present invention relates to electronic apparatuses capable of outputting image information and/or audio information transferred from a portable information terminal, and particularly relates to control over a display screen in response to an interrupt occurring in a portable information terminal.

2. Description of the Related Art

In recent years, multi-function portable apparatuses such as smart phones have been widely used. When such a portable apparatus is taken into a vehicle, the portable apparatus is connected to an electronic apparatus mounted in a vehicle (hereinafter, referred to as a vehicle-mounted apparatus) so that a function implemented in the portable apparatus may become available to a vehicle-mounted apparatus. For example, when a portable apparatus and a vehicle-mounted apparatus are connected through connecting means such as a USB cable, image data of an application shown on a display of a portable apparatus and audio data thereof are transferred to the vehicle-mounted apparatus. The transferred audio and image are then output from the vehicle-mounted apparatus (Japanese Unexamined Patent Application Publication No. 2009-281991).

While audio data and/or image data transferred from the portable apparatus is being output by the vehicle-mounted apparatus, the vehicle-mounted apparatus may be required to detect a factor causing an interrupt in the portable apparatus (interrupt factor). For example, while the portable apparatus is executing a navigation function, the vehicle-mounted apparatus may be required to provide notification of an interrupt caused by an event such as guidance at an intersection. The same is true when an incoming telephone call or an electronic mail is received. Japanese Unexamined Patent Application Publication No. 2003-319020 discloses a technique that provides a notification mode preferred by a user when an interrupt such as receiving an incoming telephone call or an electronic mail by a portable apparatus has occurred.

FIGS. 1A and 1B illustrate an interrupt detection method of the related art. FIG. 1A illustrates an interrupt detection method with hardware having a dedicated interrupt signal line. As illustrated in FIG. 1A, a portable apparatus 10 and a vehicle-mounted apparatus 20 are connected through an audio/image signal line 30 for sending and receiving audio and image signals and an interrupt signal line 32 for sending and receiving an interrupt signal. When an interrupt factor occurs, the portable apparatus 10 changes the voltage level of the interrupt signal line 32 to a high or low level, and the vehicle-mounted apparatus 20 detects the start and end of the interrupt.

FIG. 1B illustrates an interrupt detection method with software using a communication protocol for an interrupt. A portable apparatus 10 and a vehicle-mounted apparatus 20 are connected through an audio/image signal line 30 to send and receive a signal according to an audio transfer protocol, an image transfer protocol, or an interrupt protocol through the audio/image signal line 30. When an interrupt factor occurs, the portable apparatus 10 transfers an interrupt signal to the vehicle-mounted apparatus 20 in accordance with an interrupt protocol, and the vehicle-mounted apparatus 20 detects the start and end of the interrupt.

The so-called terminal mode has been proposed in which when a portable apparatus that is a multifunction information terminal such as a smart phone is connected to a vehicle-mounted apparatus, screen data and audio data relating to an application started in the portable apparatus are transferred to the vehicle-mounted apparatus, and the screen data and audio data are output from the vehicle-mounted apparatus.

A portable apparatus that is a multifunction information terminal is capable of starting two or more applications simultaneously, and may, for example, execute a music play application and a navigation application simultaneously. In this case, the portable apparatus handles a screen of one application in front (foreground screen) and a screen of the other application at the back (background screen). In the terminal mode, the portable apparatus is configured to transfer the front screen information thereof to the vehicle-mounted apparatus. If a music play screen is displayed in front and the navigation screen at the back in the portable apparatus, the music play screen is displayed in the vehicle-mounted apparatus. Audio data generated by music play is transferred from the portable apparatus, and music is output through a speaker of the vehicle-mounted apparatus. FIG. 2A illustrates an example in which a music play screen is displayed on a display 22 of the vehicle-mounted apparatus 20.

If an interrupt such as guidance at an intersection (intersection guidance) occurs in a navigation application being executed in the portable apparatus 10, the portable apparatus temporarily stops the output of audio data for music play and starts the output of audio data for the intersection guidance. Thus, also in the vehicle-mounted apparatus, the audio output for music play is switched to the audio output for the intersection guidance. However, the music play screen of the portable apparatus remains in front. Thus, in the vehicle-mounted apparatus, the music play screen is displayed, preventing display of the intersection guidance screen. FIG. 2B illustrates a relationship between a display screen of the display 22 in a vehicle-mounted apparatus and output audio when an interrupt such as intersection guidance as described above occurs.

Further, when the interrupt detection technique illustrated in FIG. 1A is used, hardware resources may be required for both the portable apparatus 10 and the vehicle-mounted apparatus 20, which increases the costs. When the interrupt detection technique illustrated in FIG. 1B is used, the implementation of a particular protocol for detecting the interrupt may be required, which also increases the costs for the software development. Furthermore, there is a common problem to the methods illustrated in FIGS. 1A and 1B that since audio data/image data and interrupt information are transmitted via different signal lines and/or independent communication protocols, it is difficult to completely synchronize the transmission of an interrupt with the transmissions of audio and image. Further, since an interrupt request is given unilaterally from the portable apparatus to the vehicle-mounted apparatus, it is difficult for the vehicle-mounted apparatus to output audio/images as required.

SUMMARY

In order to solve the problems of the related art as described above, it is desirable to provide an electronic apparatus and an electronic system which control output of image data and/or audio data in response to the occurrence of an interrupt event in a portable information terminal.

An electronic apparatus according to an embodiment of the present invention is capable of, when connected to a portable information terminal, receiving image data and audio data relating to an application executed in the portable information terminal and outputting the image data and audio data. The electronic apparatus includes receiving means for receiving image data and audio data transferred from the portable information terminal, output means for outputting the image data and audio data received by the receiving means, determining means for determining the presence of an interrupt event in the portable information terminal on the basis of identification information added to the audio data received by the receiving means, and control means for transmitting a control signal for transferring image data relating to an application in which an interrupt event occurs to the portable information terminal if the determining means determines that the interrupt event is present.

The determining means preferably includes detecting means for detecting identification information added to audio data, and, when the identification information detected by the detecting means changes from first identification information to second identification information, determines that an interrupt event has occurred and when identification information changes from the second identification information to the first identification information, determines that the interrupt event has ended. When it is determined that an interrupt event has occurred, the control means preferably transmits a first control signal for transferring image data relating to an application in which the interrupt event has occurred and transmits a second control signal for transferring image data relating to the original application when it is determined that the interrupt event has ended. The output means preferably outputs image data relating to an application in which an interrupt event has occurred in response to a period from the transmission of the first control signal to the transmission of the second control signal. The control means preferably further includes priority determining means for determining priority when interrupt events conflict, and the control means causes the output means to output image data and audio data of higher priority out of image data and audio data received from the receiving means in accordance with the priority determined by the priority determining means. The identification information preferably identifies an interrupt event included in an application. The control signal and the first and second control signals are preferably signals that request the start of an application to the portable information terminal.

An electronic apparatus according to another embodiment of the present invention is capable of, when connected to a portable information terminal, receiving image data and audio data transferred from the portable information terminal and outputting the image data and audio data. The electronic apparatus includes receiving means for receiving image data transferred from the portable information terminal, executing means for executing an application, output means capable of outputting selectively one of image data received by the receiving means and image data relating to an application executed by the executing means, determining means for determining the presence of an interrupt event in the portable information terminal on the basis of identification information added to the image data received by the receiving means, and control means for causing the output means to output image data in which the interrupt event has occurred if the determining means determines that an interrupt event is present.

The determining means preferably includes detecting means for detecting identification information added to the image data, and, when the identification information detected by the detecting means changes from first identification information to second identification information, determines that an interrupt event has occurred and when identification information changes from the second identification information to the first identification information, determines that the interrupt event has ended. The control means preferably controls selection of image data by the output means such that image data being processed in the background is processed in the foreground when it is determined that an interrupt event has occurred and image data being processed in the foreground is processed in the background when it is determined that the interrupt event has ended. When it is determined that an interrupt event has occurred while the output means is processing image data received by the receiving means in the background and processing image data relating to an application executed by the executing means in the foreground, the control means preferably causes the image data received by the receiving means to be processed in the foreground and causes the image data relating to an application executed by the executing means to be processed in the background.

An electronic system according to another embodiment of the present invention includes an electronic apparatus having the aforementioned characteristics and a portable information terminal connected to the electronic apparatus. The portable information terminal includes processing means for processing image data and audio data relating to a selected application in the foreground and processing image data and audio data relating to another application in the background when two or more applications are being executed, output means for outputting image data and audio data processed in the foreground to the electronic apparatus, and adding means for adding identification information to at least audio data output from the output means. When an interrupt event occurs in the other application, the output means outputs audio data, to which identification information by which the interrupt event is identifiable is added, to the electronic apparatus. The output means, when receiving the control signal from the electronic apparatus, preferably processes image data relating to the other application in the foreground.

An electronic system according to another embodiment of the present invention includes an electronic apparatus having the aforementioned characteristics and a portable information terminal connected to the electronic apparatus. The portable information terminal includes output means for outputting image data and audio data relating to an executed application to the electronic apparatus, and adding means for adding identification information by which at least an interrupt event is identifiable to image data output from the output means.

An output control method is a method for an electronic apparatus according to an embodiment of the present invention that is capable of, when connected to a portable information terminal, receiving image data and audio data relating to an application executed in the portable information terminal and outputting the image data and audio data. The output control method includes the steps of receiving image data and audio data transferred from the portable information terminal, outputting the received image data and audio data, determining the presence of an interrupt event in the portable information terminal on the basis of identification information added to the received audio data, and transmitting a control signal for transferring image data relating to an application in which an interrupt event occurs to the portable information terminal if it is determined that an interrupt event is present.

An output control method is a method for an electronic apparatus according to an embodiment of the present invention that is capable of, when connected to a portable information terminal, receiving image data and audio data transferred from the portable information terminal and outputting the image data and audio data. The output control method includes the steps of receiving image data and audio data transferred from the portable information terminal, outputting selectively one of the received image data and image data relating to an application executed in the electronic apparatus, determining the presence of an interrupt event in the portable information terminal on the basis of identification information added to the received image data, and outputting image data in which an interrupt event occurs to the portable information terminal if it is determined that an interrupt event is present.

An output control program is executed by an electronic apparatus according to an embodiment of the present invention that is capable of, when connected to a portable information terminal, receiving image data and audio data relating to an application executed in the portable information terminal and outputting the image data and audio data. The output control program includes the steps of receiving image data and audio data transferred from the portable information terminal, outputting the received image data and audio data, determining the presence of an interrupt event in the portable information terminal on the basis of identification information added to the received audio data, and transmitting a control signal for transferring image data relating to an application in which an interrupt event occurs to the portable information terminal if it is determined that an interrupt event is present.

An output control program is executed by an electronic apparatus according to an embodiment of the present invention that is capable of, when connected to a portable information terminal, receiving image data and audio data transferred from the portable information terminal and outputting the image data and audio data. The output control program includes the steps of receiving image data and audio data transferred from the portable information terminal, outputting selectively one of the received image data and image data relating to an application executed in the electronic apparatus, determining the presence of an interrupt event in the portable information terminal on the basis of identification information added to the received image data, and outputting image data in which an interrupt event occurs to the portable information terminal if it is determined that an interrupt event is present.

According to some embodiments of the present invention, an interrupt event is determined on the basis of identification information added to audio data and/or image data. Accordingly, image data relating to the interrupt event may be displayed appropriately. This may reduce costs for hardware and/or software development, compared with interrupt detections of the related art.

BRIEF DESCRIPTION OF THE DRAWINGS

FIG. 9 illustrates a sequence of an output control operation in an electronic apparatus when an interrupt event occurs in an information terminal according to a first embodiment of the present invention;

FIG. 11 illustrates a sequence of an output control operation in an electronic apparatus when an interrupt event occurs in an information terminal according to a second embodiment of the present invention;

DESCRIPTION OF THE PREFERRED EMBODIMENTS

Embodiments of the present invention will be described with reference to the attached drawings. According to a preferred embodiment of the present invention, an electronic system may be provided in which a portable information terminal (hereinafter referred to as an information terminal) is connected to an electronic apparatus mounted in a vehicle that is a mobile unit. The information terminal may be a portable apparatus capable of processing information and preferably is a multifunction terminal having a communication function. For example, the information terminal may be a cellular phone, a smart phone, a palmtop personal computer, a laptop computer, a notebook computer or the like. The information terminal may implement various functions by executing applications implemented therein, including an external network connection, a voice call, and storage of audio data and video data.

On the other hand, the electronic apparatus mounted in a vehicle may include an audio/video play function, a television/radio broadcasting receiving function, a navigation function, and so on. The electronic apparatus may be connected to the information terminal through wired or wireless data communication means so that data may be exchanged between the apparatuses. The data communication means are not particularly limited. Data communication may be implemented by connection via a USB cable, short-distance wireless connection based on Bluetooth☐ technology, a wireless LAN, or Wi-Fi, for example.

Preferably, the electronic apparatus has an operation mode allowing remote control on an information terminal when connected to the information terminal. The information terminal transmits audio signal and/or video signal relating to an application started by a remote control to the electronic apparatus. The electronic apparatus outputs audio based on the received audio signal and displays the video signal on a screen.

First Embodiment

Figure 1A:
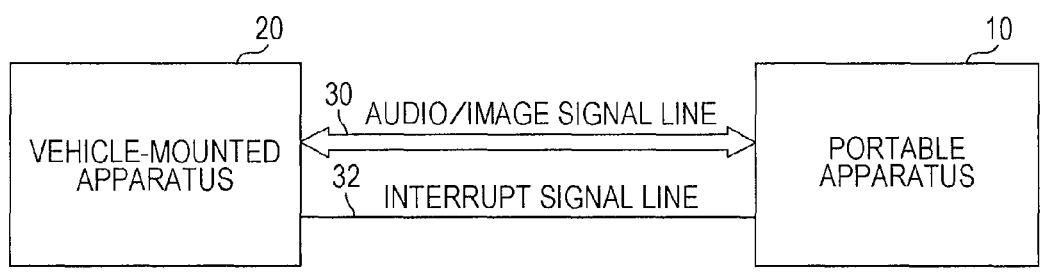
FIG. 1A illustrates an interrupt detection method with hardware having an interrupt signal line.
Figure 1B:
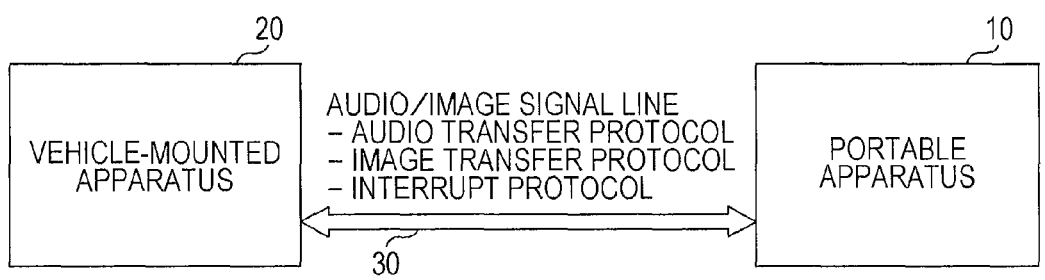
FIG. 1B illustrates an interrupt detection method with software using a communication protocol for an interrupt, according to the related art.
Figure 2A:
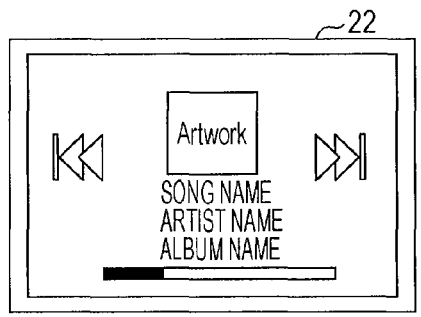
FIGS. 2A and 2B illustrate an example of a display screen of a vehicle-mounted apparatus when an interrupt occurs in a portable apparatus according to the related art.
Figure 2B:
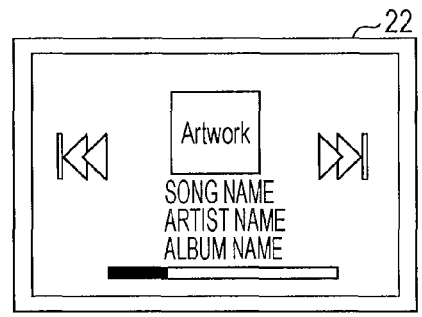
Figure 3:
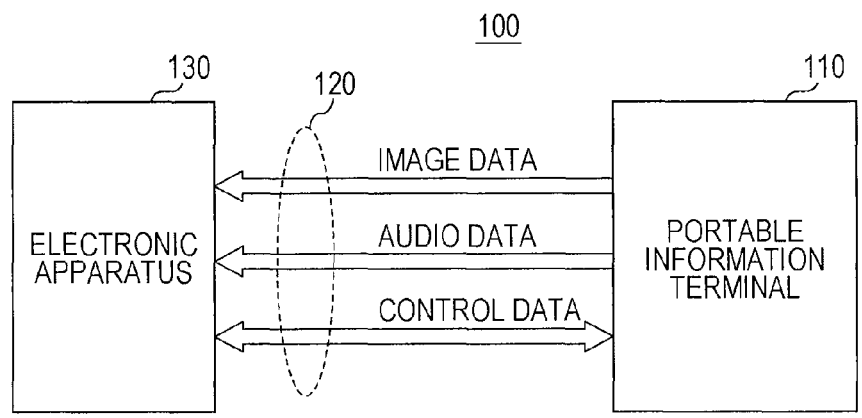
FIG. 3 illustrates a configuration of an electronic system according to an embodiment of the present invention.

FIG. 3 illustrates a configuration of an electronic system according to a first embodiment of the present invention. An electronic system 100 according to this embodiment includes an information terminal 110 and an electronic apparatus 130 connected to the information terminal 110 through a connecting means 120. Preferably, the information terminal 110 may be a multifunction smart phone having a communication function. The electronic apparatus 130 may include a television receiving function and a media play function for a CD, a DVD or the like and further includes a display and a speaker in a space within a vehicle.

According to this embodiment, the connecting means 120 is a USB (Universal Serial Bus) cable. Instead of or in addition to this, any other radio communications such as implemented by the Bluetooth☐ technology may be used. The connecting means 120 includes signal lines for transmitting image data and audio data from the information terminal 110 to the electronic apparatus 130 and a signal line for exchanging control data between the information terminal 110 and the electronic apparatus 130. Each of the information terminal 110 and electronic apparatus 130 supports a communication protocol for communication control over image data, audio data, and control data in the specifications of a terminal mode. The electronic apparatus 130 is capable of operating in the terminal mode to remotely operate the information terminal 110.

Preferably, audio data is subject to communication control based on the Real-time Transport Protocol (RTP), and image data is subject to communication control based on the remote framebuffer (RFB) Protocol. These communication controls may allow the protocols extensible, and extension information may be added to audio data and image data. In the terminal mode according to this embodiment, the extension information to be added to audio data and image data may be application identification information for identifying an application executed by the information terminal 110, identification information for identifying an operation form included therein, or identification information for identifying the general category of operations. Such identification information representative of a general or detailed type/meaning of audio data and image data may be included in an audio transfer protocol and image transfer protocol.

Figures 4A, 4B:
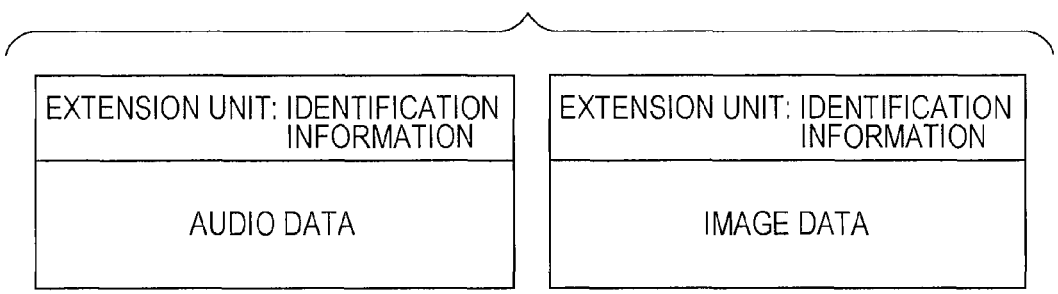
FIGS. 4A and 4B illustrate an example of identification information to be added to audio data and image data according to an embodiment of the present invention.

FIG. 4A illustrates an example of identification information to be added to audio data and image data. In this case, the same identification information is added to audio data and image data. As illustrated in FIG. 4A, identification information 0001, 0002, 0003, 0004, 0005, and 0006 are assigned to audio data and image data. The identification information 0001, 0002, 0003, 0004, 0005, and 0006 are used for identifying a menu, navigation (normal), an intersection guidance, an incoming telephone call, an outgoing telephone call, and media play, respectively. The information terminal 110 in the terminal mode includes the identification information in the audio/image protocol when transferring audio data and image data to the electronic apparatus 130. FIG. 4B illustrates an aspect in which the identification information is added to audio data and image data. The electronic apparatus 130 detects the identification information included in the audio/image protocol received from the information terminal 110 and, on the basis of the identification information, controls output of the audio data and/or screen data.

Figure 5:
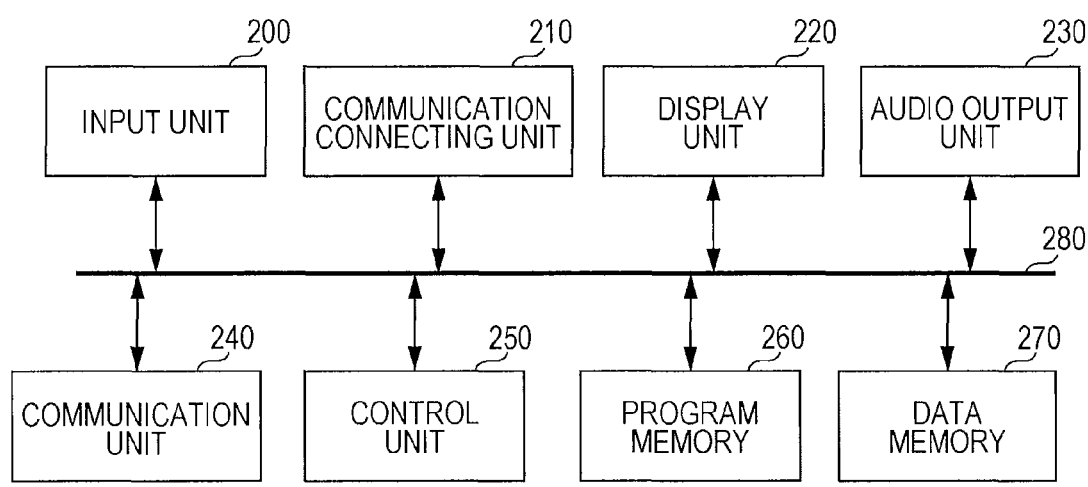
FIG. 5 is a block diagram illustrating a typical configuration of an information terminal illustrated in FIG. 3.

FIG. 5 is a block diagram illustrating a typical configuration of the information terminal. The information terminal 110 includes an input unit 200 which receives an input from a user, a communication connecting unit 210 which allows a connection to the electronic apparatus 130 through the connecting means 120, a display unit 220 which shows various images on a display thereof, an audio output unit 230 which outputs audio, a communication unit 240 which allows data communication with an external network and a telephone call over a public wireless network, a control unit 250, a program memory 260 which stores an application, a program and/or the like held by the information terminal 110, a data memory 270 which stores audio data, image data, roadmap data and various other data, and a bus 280 which connects these units.

The program memory 260 stores various kinds of application software and programs. The control unit 250 executes an application and/or a program stored in the program memory 260. The program memory 260 may store, for example, an application for reproducing audio data and/or image data stored in the data memory 270, an application for executing a game, an application for executing a navigation function, an application allowing a voice call, and/or an application for browsing information over the Internet through the communication unit 240.

The program memory 260 may further store an extension program that controls the terminal mode when the information terminal 110 is connected to the electronic apparatus 130 through the connecting means 120. The extension program receives input operation information and other command information input by a user operation from the electronic apparatus 130 and, in response to that, starts or ends an application in the information terminal 110. The extension program transfers the identification information assigned to image data and audio data relating to the started application to the electronic apparatus 130 in accordance with the audio transfer protocol and image transfer protocol. In this case, the identification information of the application and/or identification information representative of a detailed type and meaning of the application, as illustrated in FIG. 4A, is added to the image data and audio data to be transferred.

When two or more applications are being executed in the information terminal, for example, when a music play application and a navigation application are being executed, the control unit 250 processes image data relating to one application in the foreground and causes the display unit 220 to display the data and processes image data relating to the other application in the background and does not display the data of the other application. For example, a music play screen is displayed on the display unit 220 while a navigation screen showing a roadmap of an area including and surrounding the vehicle is not displayed by the background processing. The audio output unit 230 outputs a reproduced tune. In the terminal mode, foreground image data and audio data are transferred to the electronic apparatus 130. When the control unit 250 receives a signal that requests the start of an application from the electronic apparatus 130 through the communication connecting unit 210, the control unit 250 processes the application in the foreground and displays the image data. The start of an application may be requested by, for example, a user by selecting an icon shown on the display of the electronic apparatus 130. Moreover, according to this embodiment, when it is determined that an interrupt event has occurred in the information terminal, as will be described below, the electronic apparatus 130 outputs a signal that requests the start of the application automatically.

Figure 6:
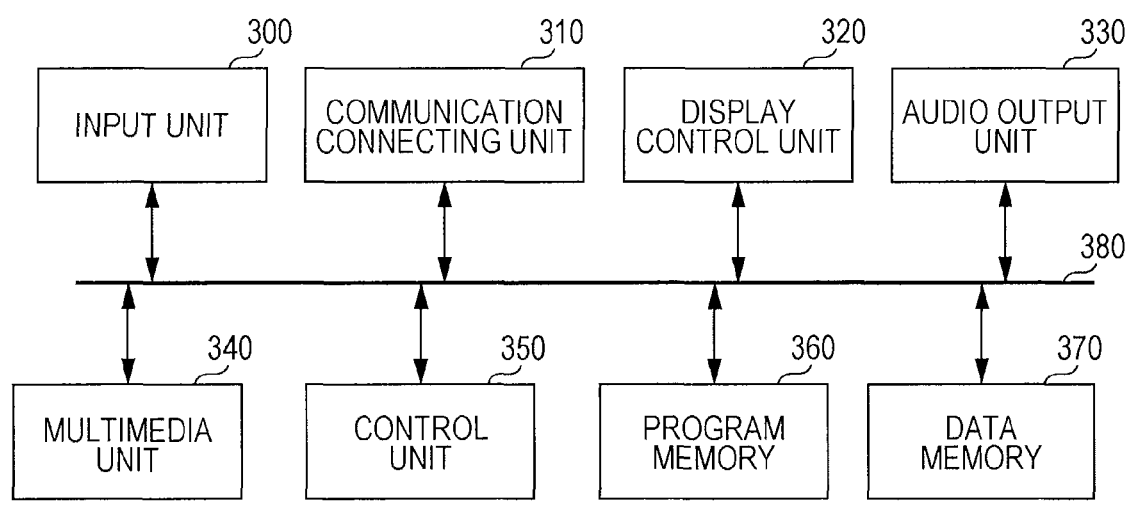
FIG. 6 is a block diagram illustrating a typical configuration of an electronic apparatus illustrated in FIG. 3.

FIG. 6 is a block diagram illustrating a typical configuration of the electronic apparatus. As illustrated in FIG. 6, the electronic apparatus 130 includes an input unit 300 which receives an input from a user, a communication connecting unit 310 which allows connection to the information terminal 110 through the connecting means 120, a display control unit 320 which causes image data to be shown on a display, an audio output unit 330 which outputs audio through a speaker, a multimedia unit 340 which plays various media, a control unit 350, a program memory 360 which stores various programs for executing applications, a data memory 370 which stores data such as audio data, video data, and map data, and a bus 380 which connects these units.

The multimedia unit 240 has a function of reproducing audio data and/or image data recorded on or in a CD, a DVD, a Blu-ray Disc, and a memory medium, the data memory 270 or the like and a function of receiving and reproducing television broadcasting or radio broadcasting. The program memory 360 stores an application relating to a navigation function, a program which controls the multimedia unit 240, and a program which controls the terminal mode when the information terminal 110 is connected. The programs and applications stored in the program memory 360 are executed by the control unit 350. The electronic apparatus 130 may receive GPS information, vehicle speed information, direction information and so on that are necessary for a navigation operation.

Figure 7:
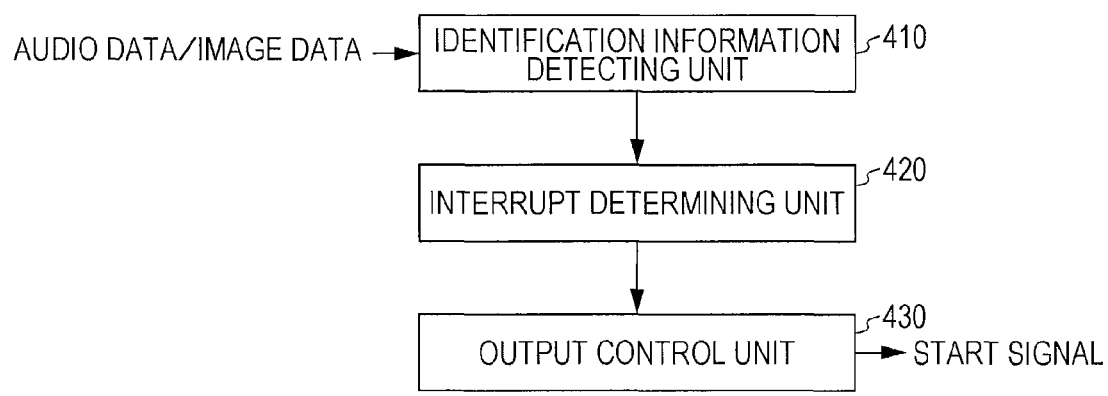
FIG. 7 is a functional block diagram of an output control program for an electronic apparatus according to an embodiment of the present invention.

The program memory 360 further includes an output control program which controls output of audio data and/or image data transferred from the information terminal 110 in the terminal mode. FIG. 7 is a functional block diagram of the output control program. An output control program 400 has an identification information detecting unit 410 which detects identification information added to audio data and image data received from the information terminal 110 through the communication connecting unit 310, an interrupt determining unit 420 which determines whether or not an interrupt event has occurred in the information terminal 110 on the basis of the identification information detected by the identification information detecting unit 410, and an output control unit 430 which outputs a signal that requests the start of an application to the information terminal 110 on the basis of the determination result by the interrupt determining unit 420. According to one embodiment, the output control unit 430 may control the display screen of the display control unit 320 in the electronic apparatus 130 and control audio output by the audio output unit 330.

Figure 8:
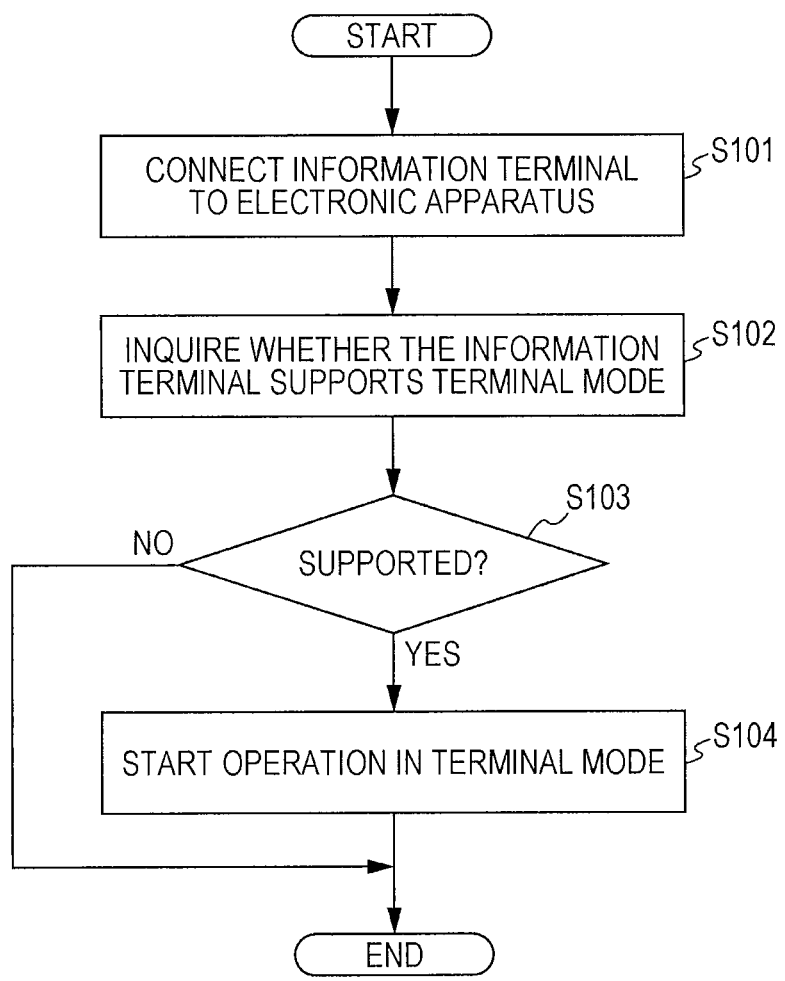
FIG. 8 is a flowchart describing a shift to a terminal mode in an electronic system of an embodiment of the present invention.

Next, a shift of the electronic apparatus 130 to the terminal mode will be described with reference to the flowchart in FIG. 8. The terminal mode is an operation mode in which the electronic apparatus 130 may remotely control the information terminal 110 and output audio data and video data transferred from the information terminal 110. When the information terminal 110 is connected to the electronic apparatus 130 via a USB cable, for example, (S101), both of the apparatus are mutually recognized with the USB plug and play. Next, the electronic apparatus 130 asks the information terminal 110 whether the information terminal 110 supports the terminal mode or not (S102). If the electronic apparatus 130 receives a replay that the information terminal 110 supports the terminal mode from the information terminal 110 (S103), the electronic apparatus 130 starts operating in the terminal mode (S104). At the same time, the information terminal 110 is also allowed to operate in the terminal mode. When a USB connection is effective, the information terminal 110 may receive power from the electronic apparatus 130, and its battery becomes chargeable.

In the terminal mode, image data on a display screen of the display of the information terminal 110 is transferred to the electronic apparatus 130, and the same display screen is output to the display of the electronic apparatus 130. The display shows an icon and/or a menu of an application in the information terminal 110, which may be remotely controlled from the electronic apparatus 130. When the display supports a touch panel input, a user input operation (coordinate information) is transmitted to the information terminal 110 through a touch panel, and the processing corresponding to the input operation is executed in the information terminal 110. The same is true for input operations from a mouse, a remote controller or other input interfaces.

Next, output control over image data when an interrupt occurs in an electronic apparatus in the terminal mode will be described. FIG. 9 illustrates an operation sequence to be performed when an interrupt event has occurred in the information terminal 110 while the information terminal 110 is executing two or more, two in this case, applications at the same time.

Figure 10A:
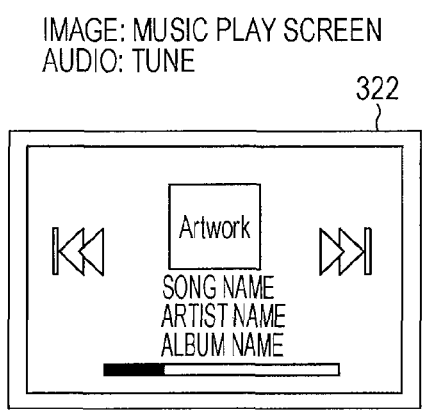
FIGS. 10A and 10B illustrate a transition example of a display screen of an electronic apparatus when an interrupt event occurs in an information terminal according to a first embodiment of the present invention.

In the information terminal 110, a navigation application and a music play application are being simultaneously executed, and a music play screen relating to the music play application is displayed as a foreground screen while a navigation screen as a background is not displayed (S201). The information terminal 110 may, for example, perform foreground processing on the application started last by a user. In the terminal mode, the information terminal 110 transfers image data on the music play screen that is a foreground screen and reproduced audio data to the electronic apparatus 130. To the image data and audio data, identification information (0006: media play) indicative of a media play application is added. On the other hand, in the electronic apparatus 130, the music play screen transferred from the information terminal 110 is shown on the display, and the reproduced audio data is output from the speaker (S301). FIG. 10A illustrates an example in which a music play screen is shown on a display 322 of the electronic apparatus 130.

In the navigation application, when a route to a destination is set, an interrupt event of intersection guidance occurs at a certain timing in accordance with the movement of the vehicle or information terminal 110. In this case, audio output of intersection guidance interrupts the audio data being reproduced in the information terminal 110 (S202). This stops the transfer of audio data of the music play from the information terminal 110, and the audio data of intersection guidance subject to the interrupt processing is transferred to the electronic apparatus 130. In this case, identification information (0003: intersection guidance) for identifying the audio data is added to the audio data of intersection guidance.

The identification information detecting unit 410 (FIG. 7) in the electronic apparatus 130 detects the identification information added to the audio data and supplies it to the interrupt determining unit 420. The interrupt determining unit 420 determines that an interrupt event has occurred in the information terminal 110 on the basis of the fact that the identification information has changed, that is, the identification information has changed from "0006" to "0003". The output control unit 430 is notified of the determination result and outputs a signal that requests the start of a navigation function to the information terminal 110. Thus, the electronic apparatus 130 enters an interrupt mode (S302).

If the information terminal 110 receives the start signal for a navigation function through the communication connecting unit 210, the information terminal 110 in response to the start signal performs switching between the foreground screen and the background screen, resulting in a navigation screen as the foreground screen and a music play screen as the background screen (S203). Thus, the foreground navigation screen is transferred from the information terminal 110 to the electronic apparatus 130. In this case, identification information indicative of intersection guidance is added to the image data transferred as the foreground screen.

Figure 10B:
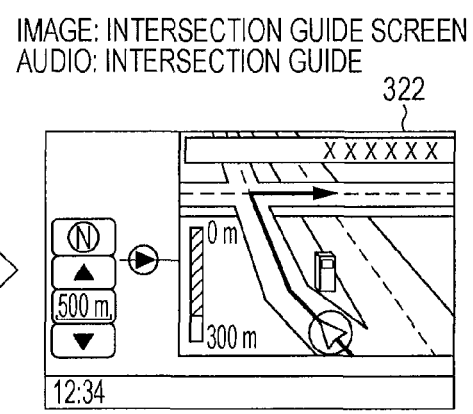

The electronic apparatus 130 receives the navigation screen transferred from the information terminal 110 and causes the display to show it (S303). In this way, in response to the detection of audio data of intersection guidance, the display screen in the electronic apparatus 130 may be changed to a navigation screen including the intersection guidance. FIG. 10B illustrates an example in which the display screen of the display 322 of the electronic apparatus 130 changes from the music play screen to a navigation screen.

After that, when the interrupt event of intersection guidance ends (S204), the information terminal 110 again outputs reproduced audio data to the electronic apparatus 130. Identification information "0006" representing the media play is added to the audio data.

The identification information detecting unit 410 in the electronic apparatus 130 detects identification information that is the media play added to the audio data. The interrupt determining unit 420 determines that the interrupt event has ended on the basis of the fact that the identification information has changed from "0003" to "0006". Then, with the determination result, the output control unit 430 outputs a signal to start a music play application to the information terminal 110 in order to cancel the interrupt mode (S304).

If the information terminal 110 receives a start signal for the music play application, the information terminal 110 changes the music play screen to the foreground and the navigation screen to the background (S205). Thus, the information terminal 110 outputs image data on a music play screen and reproduced audio data to the electronic apparatus 130. The display screen of the display of the electronic apparatus 130 is shifted to the music play screen (S305).

According to this embodiment, the output control unit 430 in the electronic apparatus 130 outputs a signal that requests switching of the display screen in the information terminal 110 in response to the change of the identification information of audio data transferred from the information terminal 110 as a trigger. However, an interrupt may be determined on the basis of the identification information added to image data. In this case, in order to detect the identification information of image data, the image data may be required to undergo foreground processing in the information terminal 110. Thus it may be difficult to securely determine the occurrence of an interrupt event.

According to the embodiment, the occurrence of an interrupt event is determined by adding the identification information to intersection guidance that is one operation form of a navigation function. Alternatively, a change of the identification information added to an application may be used to determine the occurrence of an interrupt event. For example, it may be determined that an interrupt event has occurred in a mobile terminal when identification information added to audio data is changed in applications, such as when identification information of a music play application has changed to identification information of a navigation application, when the identification information of a menu application has changed to identification information of a navigation application, or the identification information of a navigation application has changed to the identification information of an application for calls including an incoming telephone call and an outgoing call.

It has further been described that when the occurrence of an interrupt event is determined, the electronic apparatus outputs a signal that requests the information terminal to start an application. However, the signal may be any signal depending on the specifications of the information terminal. In other words, the signal may only be required to be a control signal or a select signal so that the image data relating to an application determined as having an interrupt event in the information terminal is processed in the foreground and transferred to the electronic apparatus.

Second Embodiment

Next, a second embodiment of the present invention will be described with reference to FIG. 11. FIG. 11 illustrates a flowchart in which a change of identification information of image data from the information terminal 110 triggers switching between a foreground screen and a background screen in an electronic apparatus. In this case, in the terminal mode, the information terminal 110 executes a navigation application. The information terminal 110 is taken into a vehicle, detects the position of the vehicle, and displays a navigation screen including a roadmap of an area including the vehicle position and its surroundings (S401). Image data and audio data relating to a navigation function is transferred from the information terminal 110 to the electronic apparatus 130.

On the other hand, in the electronic apparatus 130, the multimedia unit 240 is operated to play a medium such as a CD or DVD. A music play screen is shown as a foreground screen on a display of the electronic apparatus 130. A navigation screen from the information terminal 110 undergoes background processing and is not displayed (S501).

In the information terminal 110, when an interrupt for intersection guidance occurs (S402), image data and audio data on the intersection guidance are transferred to the electronic apparatus 130. Identification information ("0003" in FIG. 4A) indicative of the intersection guidance is added to the image data. The identification information detecting unit 410 in the electronic apparatus 130 detects identification information of intersection guidance included in the image data. The interrupt determining unit 420 determines that an interrupt event has occurred on the basis of the fact that the identification information of the image data has changed (from "0002" to "0003"). An interrupt mode then starts (S502).

The output control unit 430 controls the switching of the display screen of the display control unit 320 in the electronic apparatus 130, instead of outputting a signal that requests the information terminal 110 to start an application. In other words, the output control unit 430 performs control such that a navigation screen is displayed as a foreground screen, and a music play screen as a background screen is not displayed (S503). After that, the intersection guidance in the information terminal ends, and the screen is shifted to a normal navigation screen (S403). Then, the identification information added to the image data is changed to a normal navigation "0002". In the electronic apparatus 130, the identification information "0002" of the normal navigation is detected, and the interrupt determining unit 420 determines that the interrupt event has ended. Then, the interrupt mode is cancelled (S504). Thus, the output control unit 430 shifts the music play screen to the foreground screen and the navigation screen to the background screen (S505).

In this way, according to the second embodiment, in response to the change of the identification information of image data, the display screen of the electronic apparatus is shifted. This allows display of an interrupt image without delay and may synchronize interrupt images and interrupt audio. According to the second embodiment, like the first embodiment, a change of the identification information of audio data from the information terminal 110 may trigger switching the display screen in the electronic apparatus.

According to the first and second embodiments, the occurrence and end of an interrupt event are determined when the identification information of audio data and/or image data has changed. However, the determination of occurrence of an interrupt event on the basis of the change of the identification information may not required if the identification information may be recognized as an interrupt event. For example, in the electronic apparatus, a determination table that defines a relationship between identification information and interrupt events may be prepared in memory. If identification information "0003" is detected, the determination table is referred to. If the determination table contains the identification information "0003", the occurrence of an interrupt event may be determined.

Third Embodiment

Next, a third embodiment of the present invention will be described. The third embodiment relates to output control over audio and image data when interrupt events conflict. Preferably, the output control unit 430 stores priority information in which an application to be output by priority when interrupt events conflict is pre-defined in a memory. The priority information may be changeable by a user. FIGS. 12A to 12D illustrate an output example when an incoming call as an interrupt is received from the information terminal in an interrupt mode while an enlarged intersection view relating to intersection guidance is being displayed in the electronic apparatus.

Figure 12A:
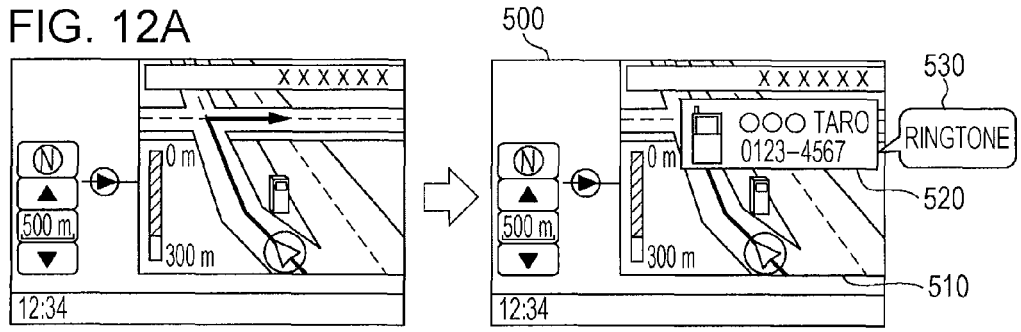
FIGS. 12A to 12D illustrate output operations by an electronic apparatus when interrupt events conflict according to a third embodiment of the present invention.

FIG. 12A illustrates an example in which a telephone function is given priority for the image and audio. As illustrated in the left part of FIG. 12A, an intersection guidance image 510 is interrupt-displayed over a roadmap image 500 of an area including and surrounding the position of the vehicle on a display of the electronic apparatus 130. These image data are transferred from the information terminal 110 and are displayed in response to the determination by the interrupt determining unit 420 that an interrupt event has occurred. In this case, when an incoming telephone call arrives at the information terminal 110, the information terminal 110 performs interrupt processing on the incoming call and interrupt-outputs an incoming call screen and a ringtone. This adds identification information "0004" of an incoming telephone call to the audio data and image data transferred from the information terminal 110. The identification information is detected in the electronic apparatus 130.

On the basis of the detected identification information, the interrupt determining unit 420 in the electronic apparatus 130 determines that an interrupt event has occurred and supplies the determination result to the output control unit 430. The output control unit 430 controls audio output and image output in the electronic apparatus 130 on the basis of the priority information. In the example in FIG. 12A, because an incoming telephone call has priority for the audio and image, an incoming call image 520 is interrupt-displayed over the intersection guidance image 510 or roadmap image 500. The incoming call image 520 may include an indication of a caller's telephone number and so on. A ringtone 530 from the information terminal 110 is output from a speaker of the electronic apparatus 130, and audio data of the intersection guidance is filtered and is not output by the audio output unit 330.

Figure 12B:
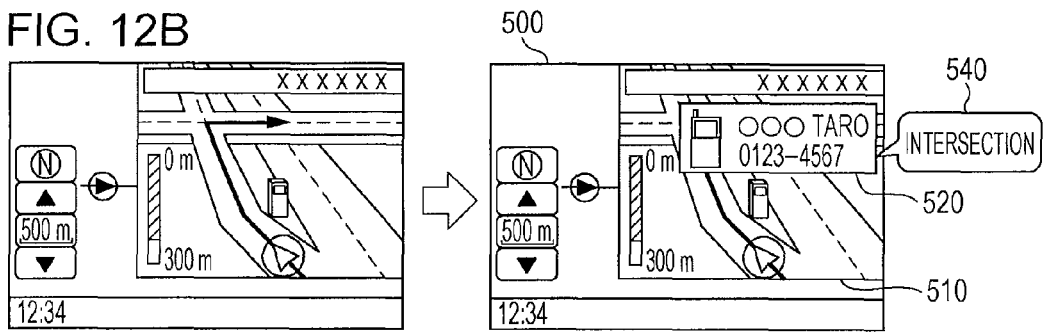

FIG. 12B illustrates an example in which an incoming call is given priority for the image, and a navigation function is given priority for the audio. In this case, an incoming call screen 520 is interrupt-displayed, but ringtone audio data is filtered and is not output from the audio output unit 33. An intersection guidance audio 540 is output from a speaker of the electronic apparatus 130.

Figure 12C:
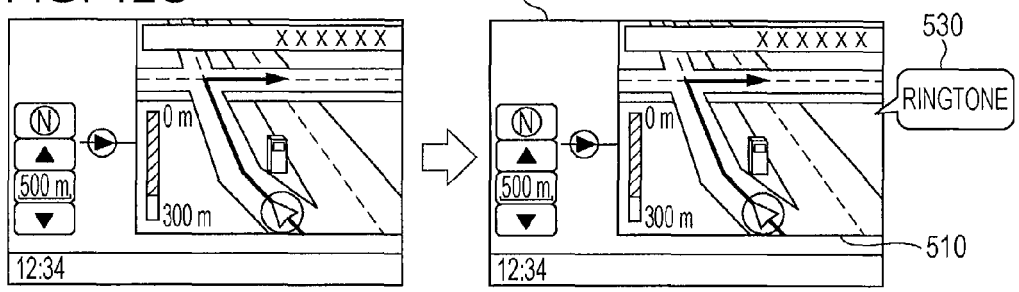

FIG. 12C illustrates an example in which the navigation function is given priority for the image, and an incoming telephone call is given priority for the audio. In this case, image data of an incoming call image transferred from the information terminal 110 is filtered and is not displayed by the display control unit 320. On the other hand, the ringtone 530 is audio output, and intersection guidance audio data is filtered and is not output.

Figure 12D:
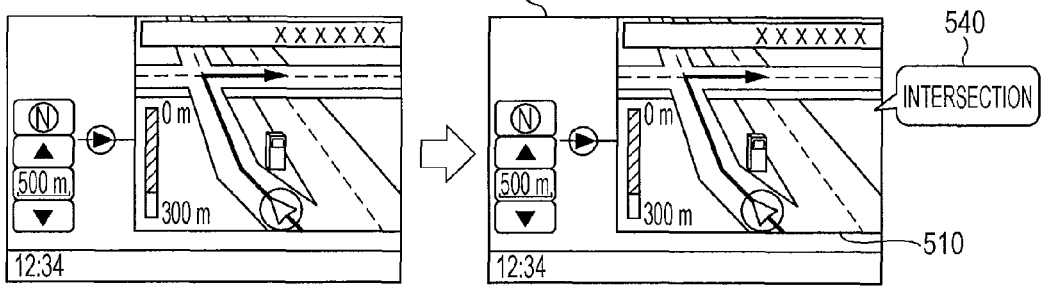
Figure 13A:
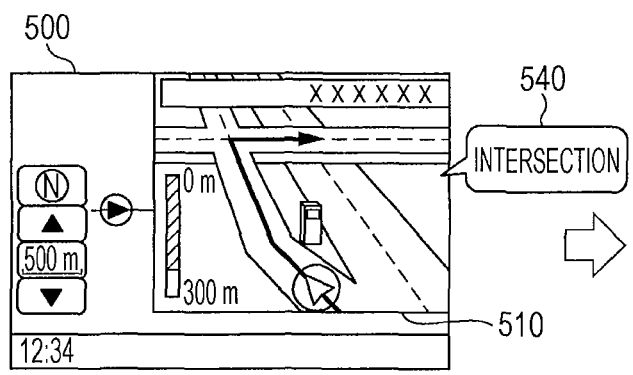
FIGS. 13A and 13B illustrate an output example by an electronic apparatus according to a variation of the third embodiment.
Figure 13B:
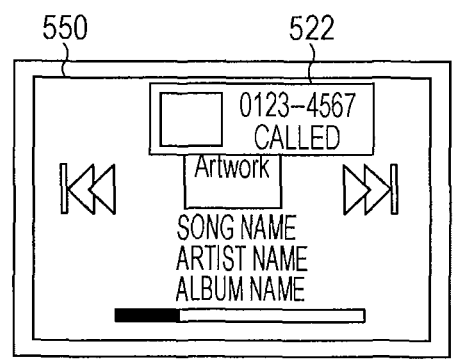

FIG. 12D illustrates an example in which the navigation function is given priority for both of the image and audio. In this case, even if it is determined that an interrupt event of an incoming telephone call has occurred, the incoming call screen image data and ringtone audio data are filtered and are not output from the electronic apparatus 130. In this case, the incoming call image may be saved, and, when the display of an enlarged intersection view for the navigation function ends, the saved incoming call image or an image generated uniquely for indicating that an incoming call has arrived may be displayed. FIG. 13A illustrates a state where an intersection guidance image 510 and an intersection guidance audio 540 are output. FIG. 13B illustrates a unique incoming call screen 522 showing "Calling" prepared in the electronic apparatus 130 is displayed on an audio play screen 550 after the end of the intersection interrupt.

According to the third embodiment, the interrupt outputs for the image and audio may be controlled on the basis of the identification information added to the image data and audio data.

According to the embodiments, the time and costs for the software/hardware development may be reduced, compared with interrupt processing of the related art. In the electronic apparatus, audio output and screen changing may be implemented as desired without particular limitation, allowing an increase in the degree of freedom in the product specifications and thus providing products that are more attractive to users. Interrupts synchronized with the audio and image may be implemented in the electronic apparatus. Moreover, identifying audio data and image data from the identification information allows blocking, in the electronic apparatus, screens and/or audios not preferred to give control to a user who is driving, for example.

According to the aforementioned embodiments, applications such as an audio play, a navigation function, and an incoming telephone call are executed. However, these are merely examples, and the present invention is applicable to other applications. Furthermore, the identification information is not required to be added to both of an audio transfer protocol and an image transfer protocol, but identification information may be added to only one of them. For example, because interrupt audio of the navigation function is substantially in synchronism with an interrupt image, the identification information added to an audio transfer protocol may allow an interrupt with as much accuracy as the related art.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An electronic apparatus capable of, when connected to a portable information terminal, receiving image data and audio data relating to an application executed in the portable information terminal and outputting the image data and audio data, the electronic apparatus comprising:
   communication means for receiving image data and audio data transferred from the portable information terminal;
   output means for outputting image data and audio data received from the portable information terminal by the communication means;
   determining means for determining the presence of an interrupt event occurring in an application executed in the portable information terminal on the basis of identification information added to the audio data received from the portable information terminal by the communication means, where the interrupt event is an event relating to one application executed in the portable information terminal that interrupts another application executed in the foreground in the portable information terminal or in the electronic apparatus; and
   control means for transmitting a control signal to the portable information terminal for transferring image data relating to an application executed in the portable information terminal for which an interrupt event occurs if the determining means determines that the interrupt event is present.

2. The electronic apparatus according to claim 1, wherein the determining means includes detecting means for detecting identification information added to audio data, and, when the identification information detected by the detecting means changes from first identification information to second identification information, determines that an interrupt event has occurred and when identification information changes from the second identification information to the first identification information, determines that the interrupt event has ended.

3. The electronic apparatus according to claim 1, wherein, when it is determined that an interrupt event has occurred, the control means transmits a first control signal for transferring image data relating to an application in which the interrupt event has occurred and transmits a second control signal for transferring image data relating to the original application when it is determined that the interrupt event has ended.

4. The electronic apparatus according to claim 3, wherein the output means outputs image data relating to an application in which an interrupt event has occurred in a period from the transmission of the first control signal to the transmission of the second control signal.

5. The electronic apparatus according to claim 1, wherein the control means further includes priority determining means for determining priority when interrupt events conflict, and the control means causes the output means to output image data and audio data of high priority out of image data and audio data received from the communication means in accordance with the priority determined by the priority determining means.

6. The electronic apparatus according to claim 1, wherein the identification information identifies an interrupt event included in an application.

7. The electronic apparatus according to claim 1, wherein the control signal is a signal that requests the portable information terminal to start an application.

8. An electronic apparatus capable of, when connected to a portable information terminal, receiving image data and audio data transferred from the portable information terminal and outputting the image data and audio data, the electronic apparatus comprising:
   communication means for receiving image data transferred from the portable information terminal;
   executing means for executing an application in the electronic apparatus;
   output means capable of outputting selectively one of image data received from the portable information terminal by the communication means and image data relating to an application executed by the executing means in the electronic apparatus;
   determining means for determining the presence of an interrupt event occurring in an application executed in the portable information terminal on the basis of identification information added to the image data received from the portable information terminal by the communication means, where the interrupt event is an event relating to one application executed in the portable information terminal that interrupts another application executed in the foreground in the portable information terminal or in the electronic apparatus; and
   control means for causing the output means to output image data received from the portable information terminal for which the interrupt event has occurred if the determining means determines that an interrupt event is present.

9. The electronic apparatus according to claim 8, wherein the determining means includes detecting means for detecting identification information added to image data, and, when the identification information detected by the detecting means changes from first identification information to second identification information, determines that an interrupt event has occurred and when identification information changes from the second identification information to the first identification information, determines that the interrupt event has ended.

10. The electronic apparatus according to claim 8, wherein the control means controls selection of image data by the output means such that image data being processed in the background is processed in the foreground when it is determined that an interrupt event has occurred and image data being processed in the foreground is processed in the background when it is determined that the interrupt event has ended.

11. The electronic apparatus according to claim 10, wherein when it is determined that an interrupt event has occurred while the output means is processing image data received by the communication means in the background and processing image data relating to an application executed by the executing means in the foreground, the control means causes the output means to process the image data received by the communication means in the foreground and process the image data relating to an application executed by the executing means in the background.

12. An electronic system comprising:
   an electronic apparatus capable of, when connected to a portable information terminal, receiving image data and audio data relating to an application executed in the portable information terminal and outputting the image data and audio data, the electronic apparatus including:
   communication means for receiving image data and audio data transferred from the portable information terminal;
   output means for outputting the image data and audio data received from the portable information terminal by the communication means;
   determining means for determining the presence of an interrupt event occurring in an application executed in the portable information terminal on the basis of identification information added to the audio data received from the portable information terminal by the communication means, where the interrupt event is an event relating to one application executed in the portable information terminal that interrupts another application executed in the foreground in the portable information terminal or in the electronic apparatus; and
   control means for transmitting a control signal to the portable information terminal for transferring image data relating to an application executed in the portable information terminal for which an interrupt event occurs if the determining means determines that an interrupt event is present; and
   a portable information terminal connected to the electronic apparatus.

13. The electronic system according to claim 12, wherein the portable information terminal includes:
   processing means for processing image data and audio data relating to a selected application in the foreground and processing image data and audio data relating to another application in the background when a plurality of applications are being executed;
   output means for outputting image data and audio data processed in the foreground to the electronic apparatus; and
   adding means for adding identification information to at least audio data output from the output means; and
   when an interrupt event occurs in the other application, the output means outputs audio data to which identification information by which the interrupt event is identifiable to the electronic apparatus.

14. The electronic system according to claim 13, wherein the output means processes image data relating to the other application in the foreground, when receiving the control signal from the electronic apparatus.

15. A method of operating electronic apparatus capable of, when connected to a portable information terminal, receiving image data and audio data relating to an application executed in the portable information terminal and outputting the image data and audio data, the method comprising:
   receiving image data and audio data transferred from the portable information terminal;
   outputting the received image data and audio data;
   determining the presence of an interrupt event occurring in an application executed in the portable information terminal on the basis of identification information added to the received audio data, where the interrupt event is an event relating to one application executed in the portable information terminal that interrupts another application executed in the foreground in the portable information terminal or in the electronic apparatus; and
   transmitting a control signal for transferring image data relating to an application in which an interrupt event occurs to the portable information terminal if it is determined that the interrupt event is present.

16. The method according to claim 15, wherein the determining step includes detecting identification information added to audio data, and, when the detected identification information changes from first identification information to second identification information, determining that an interrupt event has occurred and when identification information changes from the second identification information to the first identification information, determining that the interrupt event has ended.

17. The method according to claim 15, wherein, when it is determined that an interrupt event has occurred, transmitting a first control signal for transferring image data relating to an application in which the interrupt event has occurred and transmitting a second control signal for transferring image data relating to the original application when it is determined that the interrupt event has ended.

18. The method according to claim 17, wherein the outputting step outputs image data relating to an application in which an interrupt event has occurred in a period from the transmission of the first control signal to the transmission of the second control signal.

19. The method according to claim 17, further comprising determining priority when interrupt events conflict, and outputting image data and audio data of higher priority out of received image data and audio data in accordance with the determined priority.

20. The method according to claim 15, wherein the control signal is a signal that requests the portable information terminal to start an application.

* * * * *

UNITED STATES PATENT AND TRADEMARK OFFICE
CERTIFICATE OF CORRECTION

PATENT NO. : 9,467,543 B2  
APPLICATION NO. : 13/572936  
DATED : October 11, 2016  
INVENTOR(S) : Shinya Yoshikawa Page 1 of 1

It is certified that error appears in the above-identified patent and that said Letters Patent is hereby corrected as shown below:

On the Title Page

Left Column, item (75), after "Yoshikawa," replace "Fukushima" with --Iwaki--.

Signed and Sealed this
Twenty-eighth Day of February, 2017

Michelle K. Lee
*Director of the United States Patent and Trademark Office*